Jan. 27, 1925.　　　　　　　　　　　　　　　　　　1,524,354
W. HAYHURST
STUFFING BOX FOR CENTRIFUGAL PUMPS
Filed June 12, 1922

INVENTOR
W. Hayhurst

BY Marks&Clerk
ATTYS.

Patented Jan. 27, 1925.

1,524,354

UNITED STATES PATENT OFFICE.

WALTER HAYHURST, OF ACCRINGTON, ENGLAND.

STUFFING BOX FOR CENTRIFUGAL PUMPS.

Application filed June 12, 1922. Serial No. 567,805.

*To all whom it may concern:*

Be it known that I, WALTER HAYHURST, a subject of the King of Great Britain and Ireland, and resident of 8 St. James Chambers, Accrington, in the county of Lancaster, England, have invented certain new and useful Improvements Relating to Stuffing Boxes for Centrifugal Pumps, of which the following is a specification.

This invention relates to stuffing boxes for centrifugal pumps of the vertical type and adapted for the pumping of acids or other chemicals.

The object of the invention is to provide in a simple and convenient manner for the maintenance, in association with the stuffing box gland, of an effective liquid seal so that the centrifugal pump will give maximum efficiency on its suction side and be capable of use for elevating liquids to the pump.

Referring to the accompanying sheet of explanatory drawings:—

The same reference letters in the different views indicate the same or similar parts.

Figure 1:
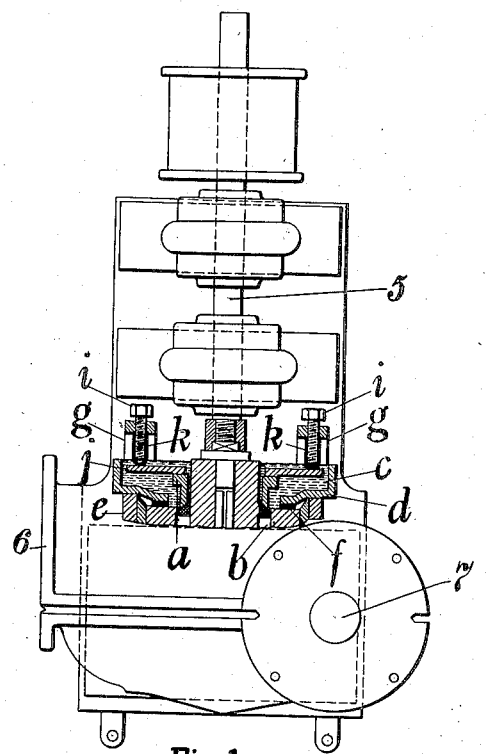
Figure 1 is a sectional elevation and Figure 2 a sectional side elevation of a vertical type centrifugal pump adapted for the pumping of acids or other chemicals and constructed in accordance with this invention.
Figure 2:
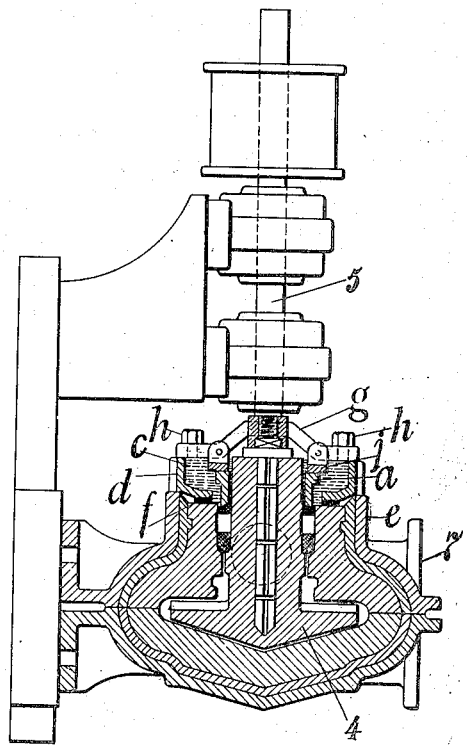
Figure 3:
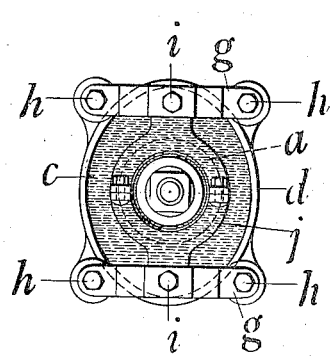
Figure 3 is a plan of the gland and seal.

4 indicates the pump impeller, 5 the pump shaft, 6 the pump suction and 7 the pump delivery connection.

The gland $a$ of the stuffing box $b$ has a liquid bath as $c$ surrounding it, the said bath being preferably formed by an annular pan or receptacle as $d$ (which may, if desired, be cast in one with the pump body $e$) having a central aperture large enough to pass over the top of the gland to enable the pan to rest upon the top of the stuffing box or the pump body $e$, a washer as $f$ being interposed to form a tight joint. The pan is secured in position by clamping bars $g$ which are held down on the pump body by the screws $h$. The said clamping bars $g$ have each a raised central portion through which pass the screws $i$. A pressure plate $j$ is interposed between the points of the said screws $i$ and the gland $a$. On screwing down the screws $i$, the gland is forced on to the packing in the stuffing box $b$ which is thus tightened. The screws $i$ are preferably covered by a sheath $k$ of rubber or other material to keep them from direct contact with the liquid in the bath.

When the machine is in service, the pan or receptacle $d$ is charged with water or with acid or other liquid similar to that to be pumped. Such liquid seal or bath will prevent access of air through the gland and stuffing box and will also serve to keep the packing soaked and thus maintain it in a swollen or effective condition.

I claim:—

In stuffing boxes for vertical centrifugal pumps, the combination with the gland and a plate seating thereon, of an annular pan containing sealing liquid submerging said gland and plate, a jointing washer interposed between said pan and the top of the stuffing box, clamping bars abutting upon said pan, screws mounted in said bars for imposing pressure on said plate, and sheaths for said screws, as set forth.

In testimony whereof I have signed my name to this specification.

WALTER HAYHURST.